United States Patent [19]

Marancik

[11] 4,011,982
[45] Mar. 15, 1977

[54] SURFACE JOINING BY BONDING OF METAL AND DEPOSITED METAL

[75] Inventor: William G. Marancik, Basking Ridge, N.J.

[73] Assignee: Airco, Inc., Montvale, N.J.

[22] Filed: Sept. 15, 1975

[21] Appl. No.: 613,645

[52] U.S. Cl. .............................. 228/208; 228/205; 228/221; 228/263
[51] Int. Cl.² ........................................ B23K 19/00
[58] Field of Search .......... 228/208, 209, 193, 194, 228/195, 221, 205, 263

[56] References Cited

UNITED STATES PATENTS

| | | | |
|---|---|---|---|
| 2,539,247 | 1/1951 | Hensel | 228/208 X |
| 3,173,202 | 3/1965 | Farber | 228/208 X |
| 3,798,746 | 3/1974 | Alphonse et al. | 228/208 X |
| 3,845,543 | 11/1974 | Roth et al. | 228/221 X |
| 3,854,984 | 12/1974 | Schadler et al. | 219/121 EB X |

OTHER PUBLICATIONS

Sherwood et al. "The Effect of Vacuum Machining on the Cold Welding of Metals" Journal of the Institute of Metals, vol. 97, pp. 1–5, 1969.

*Primary Examiner*—Al Lawrence Smith
*Assistant Examiner*—K. J. Ramsey
*Attorney, Agent, or Firm*—D. A. Draegert; E. W. Bopp

[57] ABSTRACT

A method is described for joining first and second surfaces by depositing a layer of metal on the first surface, preparing the second surface to expose fresh metal, placing the deposited metal and the exposed metal in contact, and applying sufficient pressure to join the surfaces, all done in a protective environment, such as vacuum. Also described is a related apparatus comprising an evacuable chamber, an electron-beam heated vapor source, and a pair of rollers for contacting and applying pressure to join the surfaces.

14 Claims, 1 Drawing Figure

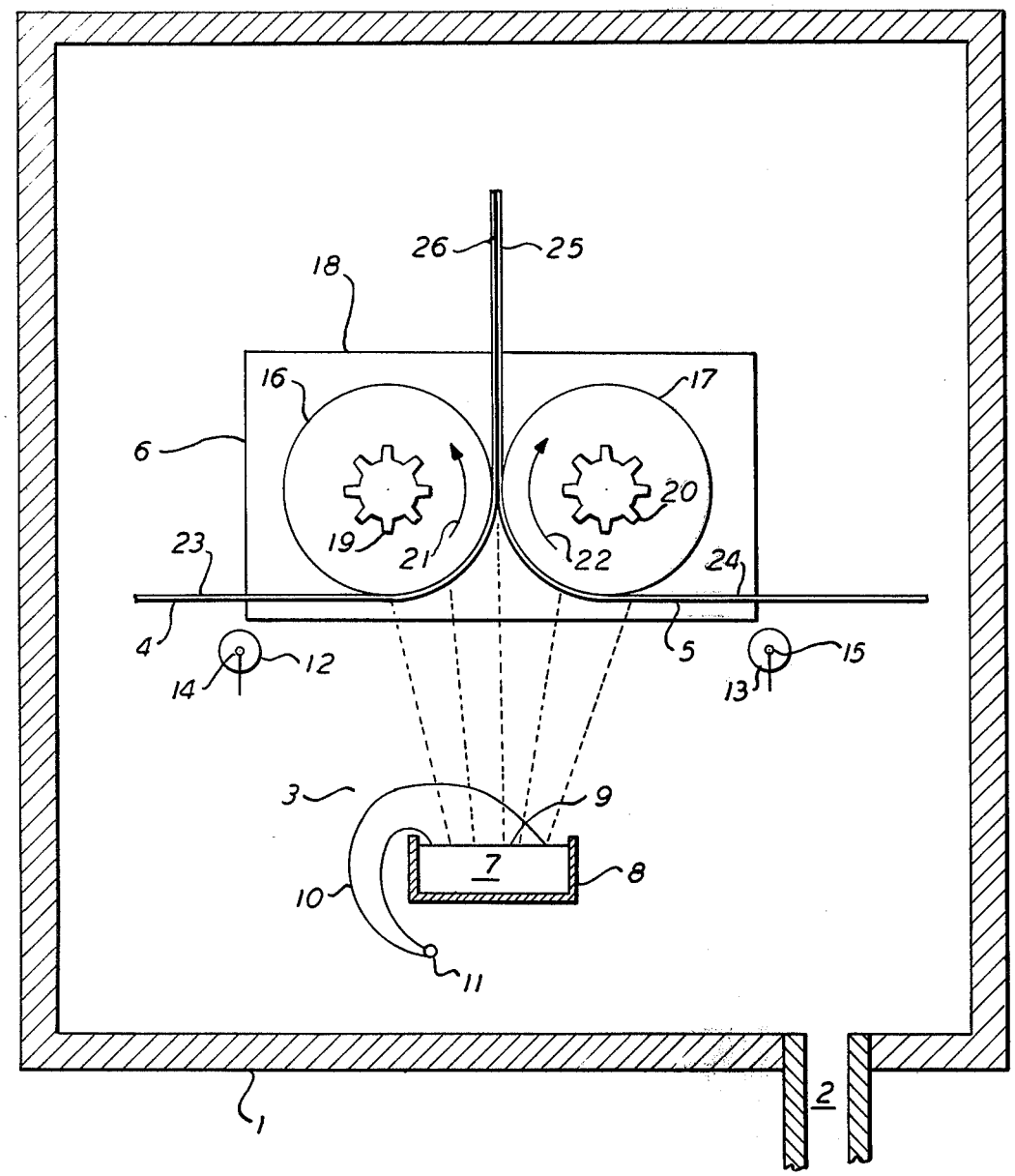

SURFACE JOINING BY BONDING OF METAL AND DEPOSITED METAL

BACKGROUND OF THE INVENTION

1. Field of the Invention

This invention relates to a surface-joining technique requiring the deposition of metal in a protective environment, such as vacuum. More particularly, the present invention relates to a method and apparatus for manufacturing a continuous strip of laminated material.

2. Description of the Prior Art

There are many conventional methods for joining two surfaces. The use of chemical adhesives and molten bonding agents are well-known. See for example U.S. Pat. Nos. 2,691,208 and 2,965,513, issued Oct. 12, 1954 and Dec. 20, 1960, respectively, to J. B. Brennan. It is also known that two surfaces can be joined by diffusion. For example, two smooth metal surfaces prepared by machining off a few micrometers from two metal strips will bond together when placed in contact under sufficient pressure. Such bonding of metal strips by machining and rolling together in vacuum is discussed in a paper by W. C. Sherwood and D. R. Miller, "The Effect of Vacuum Machining on the Cold Welding of Some Metals," Journal of the Institute of Metals, Vol. 97, pp. 1–5, 1969. With vacuum machining, satisfactory bonding is obtained with combined strip thickness reductions of 1 to 20% as compared to 60 to 95% for conventional roll bonding in air at atmospheric pressure. The practical use of vacuum machining is limited by the difficulty of obtaining a smooth, clean metal surface, particularly when joining of wide flexible strips or non-metallic materials is desired.

A laminate can also be formed by coating a substrate with material deposited from a vapor, a molten dip or a solution. Thick layers usually require large amounts of energy and large volumes of hot corrosive materials because all the coating material must be vaporized, melted or placed in solution. Further, impervious coatings are difficult and time-consuming to obtain because of problems with adherence and pin hole imperfections.

Each of the conventional deposition methods has limitations in forming thick coatings. Vapor deposition techniques usually require cooling of the substrate in order to dissipate the heat of condensation of the thick layer of deposited material. In order to obtain a thick layer in a molten dip process, it is usually necessary that the melting temperature of the coating material be less than that of the substrate material. In electroless or electroplating processes, the choice of coating materials and solutions is severely limited, and the disposal of large amounts of toxic solutions is a problem.

SUMMARY OF THE INVENTION

In the method of this invention, a first and a second surface are joined by placing them in a protective environment such as vacuum, depositing a thin layer of metal on the first surface, preparing the second surface to expose fresh metal, placing the deposited metal and the exposed metal in contact, and applying pressure sufficient to join the surfaces.

The method of this invention may be adapted to many situations requiring the joining of surfaces. The surfaces may be rigid or flexible. The surfaces may be those of discrete parts or of continuous strips.

The two surfaces may be of the same substance or of different substances. The first surface, on which a metal layer is deposited, may be metal or non-metal, as for example, plastic or paper.

The deposited layer may be a single metal, such as aluminum, copper or titanium or a metal alloy, such as a brazing alloy. The metal layer may be deposited by a variety of processes such as vapor deposition, including evaporation and sputtering, and dipping in a molten metal or a plating solution. Because only thin layers are required, the use of expensive metals, such as gold, and low-rate deposition processes, such as sputtering, are feasible. If desired, a multi-layer coating may be deposited. For example, a material which improves adherence or prevents the formation of an undesirable intermetallic may be deposited as an intermediate layer.

The second surface, which is prepared to expose fresh metal, may likewise be a metal or a non-metal. When the second surface is metal, fresh metal can be exposed by vacuum machining as described in the previously cited article by Sherwood and Miller. Simple techniques such as wire brushing could also be used but the joining would not be as durable because of the incomplete removal of impurities from the surface. Either a metal or a non-metal surface can be prepared to expose fresh metal by depositing a layer of metal. In the latter case, both the first and second surfaces are coated with metal before they are placed in contact. The two surfaces may be coated simultaneously or sequentially, and the same or different metals may be deposited on each surface.

When two layers of deposited metal are placed in contact and joined according to the method of this invention, the deposited layers are so completely bonded that they cannot be separated, and, in effect, they become a single layer of metal.

A protective environment is required in order to maintain the cleanliness of the deposited metal and the exposed metal surfaces. The protective environment must retard the formation of metal oxides and other compounds which inhibit bonding. The preferred protective environment is a vacuum of pressure less than about $10^{-2}$ Torr. Even more preferred is a pressure of less than about $10^{-4}$ Torr, at which an impurity monolayer forms on a surface in about 0.1 sec. Rather than vacuum, the protective environment could be an inert gas or liquid.

There are several advantages of the method of this invention. Because only thin deposited layers and low joining pressures are required, large substrate surfaces can be joined at high rates with low mechanical work. Because the deposited layer is very thin, condensing metal causes minimal heating of the substrate. The temperature of the substrates can be hundreds of degrees below the melting points of the substrates and the deposited metal. The melting point of the deposited metal can be higher or lower than that of the substrates.

An all-metal laminate can be formed by this invention which has high thermal and electrical conductivity and which is durable and can be bent or heated immediately. The laminate can be very flexible even without a final annealing because there is minimal cold working during joining. Because existing substrates are joined, the laminate can be impervious to liquids or vapors despite the presence of pin holes in the deposited layer.

BRIEF DESCRIPTION OF THE DRAWING

The drawing is a cross-sectional view of coating and rolling apparatus which is useful for producing laminates according to the method of the present invention.

DESCRIPTION OF THE PREFERRED EMBODIMENTS

The method of the invention may be practiced with the apparatus illustrated in the drawing. The apparatus comprises a chamber 1 which provides a protective environment, a means 3 for depositing metal on a surface 4 of a first strip 23 and preparing a surface 5 of a second strip 24 to expose fresh metal, and a means 6 for placing the deposited metal and the exposed metal in contact and applying pressure to join the surfaces.

The protective environment is provided by evacuating the chamber 1 with a conventional pump (not shown) connected to the port 2. The metal deposition means shown is a vapor source in which molten evaporant 7 is contained in a crucible 8. The evaporant is heated by a conventional means such as a beam 10 of electrons from an electron gun having a hot filament 11 and magnetic means (not shown) to deflect the electron beam onto the surface 9 of the evaporant. In order to ensure adherence of the deposited metal, the apparatus may include a means, such as lamps 12 and 13, for heating the surfaces 4 and 5 prior to the deposition of the metal. The temperature of each surface is controlled by a conventional power supply (not shown) which regulates the electric current to a lamp filament 14 or 15.

The metal contacting and pressure applying means 6 includes two rollers 16 and 17 supported by a frame 18. A drive means (not shown), such as a hand crank or a motor, two gears 19 and 20, and other gears (not shown) are adapted to rotate the rollers 16 and 17 in opposite directions as shown by the arrows 21 and 22. As in many conventional roller mills, a means (not shown) is provided for adjusting the separation distance between the rollers and thereby the pressure which is applied to the surfaces to be joined.

The two surfaces 4 and 5 of the strips 23 and 24, are joined with the illustrated apparatus by depositing a layer of metal on each of the two surfaces with means 3, and placing the deposited layers in contact and applying pressure by feeding the strips between the rollers 16 and 17 of means 6, all done within the evacuated chamber 1. The product emerging from the rollers is a laminate 25 comprising the strips 23 and 24 separated by the bonded metal layer 26.

Depending upon the composition of a strip to be joined, it may be preferred to include conventional steps such as scrubbing, degreasing and vacuum heating of the surface before it is coated with metal in order to obtain better adhesion of the metal deposit and the strip.

Many modifications of the apparatus and method described are possible. If long continuous strips are to be joined, they and the laminated product may be wound on reels inside the chamber. Alternately, the reels may be external to the chamber and the strips pass into and out of the chamber through air-vacuum roller seals. If more than two strips are to be joined into a laminate, each of the adjacent pairs of surfaces may be joined by the described method. If discrete parts are to be joined, their own weight may provide sufficient pressure, or they may be pressed together by mechanical means such as a clamp. The surfaces may be joined by placing the materials against a support and passing over them with a single roller.

EXAMPLES

Data for several all-metal laminates produced by the method of the invention are shown in the Table. In each case, Strip 1 was either stainless steel (SS) or aluminum. In all cases, Strip 2 was 100 μm thick aluminum. The strips were scrubbed and degreased and placed in a chamber with apparatus similar to that illustrated in the drawing. The chamber was evacuated to a pressure of about $5 \times 10^{-5}$ Torr. Each strip was heated to the temperature indicated and, except for Example 8, immediately coated with a layer of evaporated aluminum. The temperature of each strip during deposition was always less than 660° C, the melting point of aluminum. Except for Example 7, the deposited layer was about 3 μm thick. Except for Example 4, the coated surfaces were immediately placed in contact and passed between two rollers.

The exact pressure applied by the rollers was not measured. The pressure was such as to cause a reduction of 30% or less in the thickness of the aluminum but no significant decrease in the thickness of the stainless steel strip. When a first aluminum strip was joined to a second aluminum strip, satisfactory results were obtained with roller pressure which caused only a 4% reduction in the thickness of the combined strips. Example 7 indicates that satisfactory joining can be obtained with as little as 0.3 μm of deposited aluminum. It appears that a thinner evaporated layer and even less reduction during rolling could be used.

TABLE

EXPERIMENTAL PARAMETERS AND RESULTS OF LAMINATING TWO METAL STRIPS

| Example No. | Strip 1 Material Composition | Strip 1 Thickness (μm) | Strip 1 Temp. (C) | Strip 2 Temp. (C) | Coating Thickness (μm) | Satisfactory Joining |
|---|---|---|---|---|---|---|
| 1 | 304 SS | 75 | 260 | 260 | 3 | No |
| 2 | " | " | 315 | 315 | 3 | Yes |
| 3 | " | " | 400 | 400 | 3 | Yes |
| 4 | " | " | a | a | 3 | No |
| 5 | " | " | 385 | 205 | 3 | Yes |
| 6 | Al | 100 | 260 | 260 | 3 | Yes |
| 7 | 430 SS | 200 | 400 | 230 | 0.3 | Yes |
| 8 | peeled 304 SS | 100 | 430 | 430 | 0 | No |
| 9 | peeled 304 SS | 100 | 315 | 315 | 3 | Yes | a - Both strips were heated to 400 C but they were allowed to cool to about 25 C before rolling.

In Example 1, for which a joining failure is indicated, the separation occurred between the deposited aluminum and the stainless steel strip. This indicates that satisfactory joining was obtained only when the strips were coated at a temperature sufficiently high to ensure a good bond between the strip and the deposit. A comparison of Examples 1, 2, 5 and 6 indicates that with aluminum evaporant the strip temperature must be above 260° C for stainless steel strip but can be less than 205° C for aluminum strip. With aluminum evaporant and stainless steel strip, temperatures less than about 430° C are preferred in order to avoid the formation of brittle aluminun-iron intermetallics at the interface.

The joining failure of Example 4 indicates the desirability of rolling immediately after deposition of the coating. It is probable that the failure resulted because of the impurities which collected on the coated surfaces during the interval while the strips cooled from 400° C to room temperature. The rate of formation of impurity layers and hence the allowable interval between deposition and contact depends upon the pressure and the species of the residual gases in the chamber. It is possible that the strips of Example 4 could have been successfully bonded if a greater rolling pressure had been used.

The failure of Example 8, for which no metal was deposited, and the success of Example 9 indicate that the method of this invention allows successful joining of aluminum and stainless steel strips at lower rolling pressures than conventional roll bonding.

I claim:

1. A method of joining a first surface of a first continuous strip and a second surface of a second continuous strip, comprising:
    placing the first surface and the second surface in a vacuum environment;
    vacuum vapor depositing a metal layer on the first surface;
    preparing the second surface in vacuum to expose fresh metal;
    continuously placing the deposited metal and the exposed metal in contact in vacuum; and, still in vacuum,
    applying pressure to the contacted metal sufficient to join the surfaces.

2. The method of claim 1 in which the protective environment is a vacuum of pressure less than $10^{-4}$ Torr.

3. The method of claim 2 in which the metal layer on the first surface is vapor deposited by electron-beam heated evaporation.

4. The method of claim 3 in which the second surface is prepared by vapor depositing a metal layer by electron-beam heated evaporation.

5. The method of claim 1 in which the protective environment is a vacuum of pressure less than $10^{-2}$ Torr and the metal layer is deposited by sputtering.

6. A method of joining two continuous strips, comprising the following steps in the order stated:
    placing the strips in a vacuum of pressure less than $10^{-4}$ Torr;
    vacuum vapor depositing a metal layer on each strip by electron-beam heated evaporation;
    placing the deposited layers in contact in vacuum; and,
    still in vacuum, passing the strips between two rollers which apply pressure sufficient to join the strips.

7. The method of claim 6 in which the metal deposited is aluminum.

8. The method of claim 7 wherein each of the two continuous strips is a metal strip.

9. The method of claim 8 in which one of the strips is aluminum, further comprising:
    heating the aluminum strip to a temperature above about 205° C before depositing the aluminum layer.

10. The method of claim 8 in which one of the strips is stainless steel, further comprising, heating the stainless steel strip to a temperature greater than about 260° C before depositing the aluminum layer.

11. An apparatus for joining a first surface of a first continuous strip and a second surface of a second continuous strip, comprising:
    a chamber for providing a vacuum environment;
    metal deposition means inside the chamber for depositing a metal layer on the first surface;
    means inside the chamber for preparing the second surface to expose fresh metal; and
    means inside the chamber for continuously placing the deposited metal and the exposed metal in contact and applying pressure sufficient to join the surfaces.

12. The apparatus of claim 11;
    the metal deposition means comprises an electron-beam heated vapor source, and
    the second surface preparation means comprises an electron-beam heated vapor source for depositing a metal layer on the second surface.

13. An apparatus according to claim 12, further comprising:
    means for heating the first surface and the second surface prior to the deposition of the metal layers.

14. An apparatus according to claim 11 further comprising: means for heating the first surface prior to the deposition of the metal layer.

* * * * *